US009887808B2

(12) United States Patent
Kwak et al.

(10) Patent No.: US 9,887,808 B2
(45) Date of Patent: Feb. 6, 2018

(54) METHOD AND APPARATUS FOR IMPLEMENTING SPACE FREQUENCY BLOCK CODING IN AN ORTHOGONAL FREQUENCY DIVISION MULTIPLEXING WIRELESS COMMUNICATION SYSTEM

(71) Applicant: INTERDIGITAL TECHNOLOGY CORPORATION, Wilmington, DE (US)

(72) Inventors: Jaeyoung Kwak, Morganville, NJ (US); Robert L. Olesen, Huntington, NY (US); Aykut Bultan, Santa Clara, CA (US); Eldad M. Zeira, Huntington, NY (US); Changsoo Koo, Melville, NY (US); Fatih M. Ozluturk, Sands Point, NY (US); Yuejin Huang, Coram, NY (US); Kalpendu R. Pasad, Cupertino, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/433,011

(22) Filed: Feb. 15, 2017

(65) Prior Publication Data

US 2017/0163382 A1 Jun. 8, 2017

Related U.S. Application Data

(63) Continuation of application No. 15/061,703, filed on Mar. 4, 2016, now Pat. No. 9,608,772, which is a
(Continued)

(51) Int. Cl.
*H04L 27/26* (2006.01)
*H04B 7/06* (2006.01)
(Continued)

(52) U.S. Cl.
CPC ......... *H04L 1/0606* (2013.01); *H04B 7/0417* (2013.01); *H04B 7/066* (2013.01);
(Continued)

(58) Field of Classification Search
CPC ... H04L 1/0606; H04L 1/0003; H04L 1/0009; H04L 1/0026; H04L 5/023; H04L 5/0007;
(Continued)

(56) References Cited

U.S. PATENT DOCUMENTS 5,787,133 A 7/1998 Marchetto et al.
6,351,499 B1 2/2002 Paulraj et al.
(Continued)

FOREIGN PATENT DOCUMENTS

CA 2415632 A1 1/2002
CN 1448015 A 10/2003
(Continued)

OTHER PUBLICATIONS

3rd Generation Partnership Project (3GPP), R1-031040, "Advantages of Group-Wise Antenna Selective Transmit Diversity Scheme", Samsung, 3GPP TSG-RAN-1 Meeting #34, Seoul, Korea, Oct. 6-9, 2003, 5 pages.
(Continued)

*Primary Examiner* — Tesfaldet Bocure
(74) *Attorney, Agent, or Firm* — Condo Roccia Koptiw LLP

(57) ABSTRACT

The present invention is related to a method and apparatus for implementing space frequency block coding (SFBC) in an orthogonal frequency division multiplexing (OFDM) wireless communication system. The present invention is applicable to both a closed loop mode and an open loop mode. In the closed loop mode, power loading and eigenbeamforming are performed based on channel state information (CSI). A channel coded data stream is multiplexed
(Continued)

into two or more data streams. Power loading is performed based on the CSI on each of the multiplexed data streams. SFBC encoding is performed on the data streams for each of the paired subcarriers. Then, eigen-beamforming is performed based on the CSI to distribute eigenbeams to multiple transmit antennas. The power loading may be performed on two or more SFBC encoding blocks or on each eigenmodes. Additionally, the power loading may be performed across subcarriers or subcarrier groups for weak eigenmodes.

20 Claims, 4 Drawing Sheets

Related U.S. Application Data continuation of application No. 14/695,989, filed on Apr. 24, 2015, now Pat. No. 9,306,702, which is a continuation of application No. 14/021,783, filed on Sep. 9, 2013, now Pat. No. 9,054,924, which is a continuation of application No. 12/360,351, filed on Jan. 27, 2009, now Pat. No. 8,532,210, which is a continuation of application No. 11/201,695, filed on Aug. 11, 2005, now Pat. No. 7,505,529.

(60) Provisional application No. 60/601,338, filed on Aug. 12, 2004.

(51) Int. Cl.
  H04L 1/06       (2006.01)
  H04B 7/0417     (2017.01)
  H04L 1/00       (2006.01)
  H04L 27/156     (2006.01)
  H04L 5/00       (2006.01)
  H04L 27/00      (2006.01)

(52) U.S. Cl.
  CPC ......... *H04B 7/0626* (2013.01); *H04B 7/0632* (2013.01); *H04L 1/0003* (2013.01); *H04L 1/0009* (2013.01); *H04L 1/0026* (2013.01); *H04L 5/006* (2013.01); *H04L 5/0007* (2013.01); *H04L 27/156* (2013.01); *H04L 27/2626* (2013.01); *H04L 5/0023* (2013.01); *H04L 2027/0046* (2013.01); *Y02B 60/31* (2013.01)

(58) Field of Classification Search
  CPC ... H04L 5/006; H04L 27/2626; H04L 27/156; H04L 1/06; H04L 1/061; H04B 7/0626; H04B 7/047; H04B 7/0632; H04B 7/066; Y02B 60/31
  See application file for complete search history.

(56) References Cited

U.S. PATENT DOCUMENTS

| | | |
|---|---|---|
| 6,452,981 B1 | 9/2002 | Raleigh et al. |
| 6,473,467 B1 | 10/2002 | Wallace et al. |
| 6,493,331 B1 | 12/2002 | Walton et al. |
| 6,519,279 B1 | 2/2003 | Abdesselem et al. |
| 6,597,137 B1 | 7/2003 | Griepentrog et al. |
| 6,747,584 B2 | 6/2004 | Havelock |
| 6,859,503 B2 | 2/2005 | Pautler et al. |
| 7,002,900 B2 | 2/2006 | Walton et al. |
| 7,116,944 B2 | 10/2006 | Das et al. |
| 7,123,887 B2 | 10/2006 | Kim et al. |
| 7,194,040 B2 | 3/2007 | Menon et al. |
| 7,197,081 B2 | 3/2007 | Saito |
| 7,215,927 B2 | 5/2007 | Miyoshi |
| 7,308,035 B2 | 12/2007 | Rouquette et al. |
| 7,315,577 B2 | 1/2008 | Shao |
| 7,379,492 B2 | 5/2008 | Hwang |
| 7,440,510 B2 | 10/2008 | Sandhu et al. |
| 7,453,947 B2 | 11/2008 | Kim et al. |
| 7,499,709 B2 | 3/2009 | Das et al. |
| 7,535,969 B2 | 5/2009 | Catreux et al. |
| 7,606,204 B2 | 10/2009 | Sebastian et al. |
| 7,613,233 B2 | 11/2009 | Hottinen |
| 7,688,899 B2 | 3/2010 | Ketchum et al. |
| 7,715,485 B1 | 5/2010 | Schlegel et al. |
| 7,813,440 B2 | 10/2010 | Yamada et al. |
| 7,929,632 B2 * | 4/2011 | Shao ................ H04L 1/0606 370/330 |
| 7,929,994 B2 | 4/2011 | Kishigami et al. |
| 8,130,855 B2 | 3/2012 | Ozluturk et al. |
| 8,218,609 B2 | 7/2012 | Walton et al. |
| 8,254,335 B2 | 8/2012 | Nishio et al. |
| 8,423,044 B2 | 4/2013 | Lee et al. |
| 9,094,188 B2 | 7/2015 | Xu et al. |
| 2001/0033623 A1 | 10/2001 | Hosur |
| 2002/0122383 A1 | 9/2002 | Wu et al. |
| 2002/0191535 A1 | 12/2002 | Sugiyama et al. |
| 2003/0003863 A1 | 1/2003 | Thielecke et al. |
| 2003/0043071 A1 | 3/2003 | Lilly et al. |
| 2003/0050086 A1 | 3/2003 | Lee et al. |
| 2003/0073464 A1 | 4/2003 | Giannakis et al. |
| 2003/0103584 A1 | 6/2003 | Bjerke et al. |
| 2003/0108117 A1 | 6/2003 | Ketchum et al. |
| 2003/0133524 A1 | 7/2003 | Miller et al. |
| 2003/0148770 A1 | 8/2003 | Das et al. |
| 2003/0156572 A1 | 8/2003 | Hui et al. |
| 2003/0185309 A1 | 10/2003 | Pautler et al. |
| 2003/0218793 A1 | 11/2003 | Soneda et al. |
| 2003/0218973 A1 | 11/2003 | Oprea et al. |
| 2003/0220634 A1 | 11/2003 | Ryba et al. |
| 2003/0231706 A1 | 12/2003 | Hwang |
| 2004/0014431 A1 | 1/2004 | Lo |
| 2004/0032910 A1 | 2/2004 | Horng et al. |
| 2004/0066761 A1 | 4/2004 | Giannakis et al. |
| 2004/0072594 A1 | 4/2004 | Hwang et al. |
| 2004/0081073 A1 | 4/2004 | Walton et al. |
| 2004/0082356 A1 | 4/2004 | Walton et al. |
| 2004/0114506 A1 | 6/2004 | Chang et al. |
| 2004/0120347 A1 | 6/2004 | Lee et al. |
| 2004/0120416 A1 | 6/2004 | Pauli et al. |
| 2005/0002325 A1 | 1/2005 | Giannakis et al. |
| 2005/0047517 A1 | 3/2005 | Georgios et al. |
| 2005/0058212 A1 | 3/2005 | Shao |
| 2005/0058217 A1 | 3/2005 | Sandhu et al. |
| 2005/0128936 A1 | 6/2005 | Shao |
| 2005/0157683 A1 | 7/2005 | Ylitalo et al. |
| 2005/0239488 A1 | 10/2005 | Ebiko |
| 2005/0254596 A1 | 11/2005 | Naguib |
| 2005/0287978 A1 | 12/2005 | Maltsev et al. |
| 2006/0176977 A1 | 8/2006 | Jafarkhani et al. |
| 2007/0217538 A1 | 9/2007 | Waxman |
| 2008/0108310 A1 | 5/2008 | Tong et al. |
| 2008/0144733 A1 | 6/2008 | ElGamal et al. |
| 2008/0285670 A1 | 11/2008 | Walton et al. |
| 2009/0117911 A1 | 5/2009 | Molisch et al. |
| 2010/0166100 A1 | 7/2010 | Medvedev et al. |
| 2014/0219207 A1 | 8/2014 | Lee et al. |

FOREIGN PATENT DOCUMENTS

| | | |
|---|---|---|
| CN | 1469662 A | 1/2004 |
| CN | 1496625 A | 5/2004 |
| CN | 1501595 A | 6/2004 |
| CN | 1502180 A | 6/2004 |
| CN | 1520063 A | 8/2004 |
| DE | 10162546 A1 | 7/2003 |
| DE | 10162548 A1 | 7/2003 |
| EP | 1207661 A1 | 5/2002 |
| EP | 1241824 A1 | 9/2002 |
| EP | 1282245 A1 | 2/2003 |
| EP | 1283614 A1 | 2/2003 |
| EP | 1367760 A2 | 12/2003 |
| EP | 1408623 A2 | 4/2004 |

(56) References Cited

FOREIGN PATENT DOCUMENTS

| | | |
|---|---|---|
| EP | 1445886 A2 | 8/2004 |
| JP | 2001-044900 A | 2/2001 |
| JP | 2001-505723 A | 4/2001 |
| JP | 2003-018127 A | 1/2003 |
| JP | 2003-169036 A | 6/2003 |
| JP | 2003-347979 A | 12/2003 |
| JP | 2004-502376 A | 1/2004 |
| JP | 2004-064108 A | 2/2004 |
| JP | 2004-166232 A | 6/2004 |
| JP | 2004-173258 A | 6/2004 |
| JP | 2004-179821 A | 6/2004 |
| JP | 2004-207901 A | 7/2004 |
| JP | 2004-208234 A | 7/2004 |
| JP | 2004-215254 A | 7/2004 |
| JP | 2006-504366 A | 2/2006 |
| JP | 2007-506307 A | 3/2007 |
| TW | 512602 B | 12/2002 |
| TW | 513363 B | 12/2002 |
| TW | 567689 B | 12/2003 |
| TW | 567696 B | 12/2003 |
| TW | 567701 B | 12/2003 |
| WO | WO 2002/005506 A2 | 1/2002 |
| WO | WO 2002/007371 A2 | 1/2002 |
| WO | WO 2001/097327 A3 | 6/2002 |
| WO | WO 2002/049306 A2 | 6/2002 |
| WO | WO 2002/078211 A2 | 10/2002 |
| WO | WO 2002/082689 A2 | 10/2002 |
| WO | WO 2003/015335 A1 | 2/2003 |
| WO | WO 2003/056742 A1 | 7/2003 |
| WO | WO 2003/084092 A2 | 10/2003 |
| WO | WO 2003/085875 A1 | 10/2003 |
| WO | WO 2004/036768 A2 | 4/2004 |
| WO | WO 2004/038986 A2 | 5/2004 |
| WO | WO 2004/038987 A2 | 5/2004 |
| WO | WO 2004/077734 A2 | 9/2004 |
| WO | WO 2005/008944 A1 | 1/2005 |
| WO | WO 2005/029758 A2 | 3/2005 |
| WO | WO 2005/029759 A2 | 3/2005 |
| WO | WO 2005/036847 A2 | 4/2005 |
| WO | WO 2006/016485 A1 | 2/2006 |

OTHER PUBLICATIONS

3rd Generation Partnership Project (3GPP), TR 25.814 V0.1.0, "Technical Specification Group Radio Access Network, Physical Layer Aspects for Evolved Universal Terrestrial Radio Access (UTRA) (Release 7)", Jun. 2005, pp. 1-10.

3rd Generation Partnership Project (3GPP), TSG-R1 (02) 0570, "Per Stream Rate Control with Code Reuse TxAA and APP Decoding for HSDPA", Lucent Technologies, 3GPP TSG RAN WG1, Paris, France, Apr. 9-12, 2002, pp. 1-4.

3rd Generation Partnership Project (3GPP), TSGR1#31 R1-030212, "DSTTD with Sub-Group Rate Control", Mitsubishi Electric, 3GPP TSG RAN WG 1 #31 Tokyo, Japan, Feb. 18-21, 2003, pp. 1-10.

3rd Generation Partnership Project (3GPP), TSGR1#35 R1-031284, "DSTTD with Sub-Group Rate Control", Mitsubishi Electric, 3GPP TSG RAN WG1 #35 Lisboa, Portugal, Nov. 17-21, 2003, pp. 1-5.

3rd Generation Partnership Project (3GPP), TSG-R1(01)0879, "Increasing MIMO Throughput with Per-Antenna Rate Control", Lucent Technologies, 3GPP TSG RAN WG1, 2001, pp. 1-13.

Badic et al., "Extended Alamouti Codes in Correlated Channels using Partial Feedback", IEEE International Conference on Communications, vol. 2, Jun. 20-24, 2004, pp. 896-900.

Gao et al., "On Implementation of Bit-Loading Algorithms for OFDM Systems with Multiple-Input Multiple-Output", IEEE 56th Conference on Vehicular Technology, vol. 1, 2002, pp. 199-203.

Kaiser et al. "Space Frequency Block Codes and Code Division Multiplexing in OFDM Systems", IEEE Global Telecommunications Conference, vol. 4, Dec. 1-5, 2003, pp. 2360-2364.

Lihua et al., "SFBC-AOFDM Scheme in Fast and Frequency Selective Fading Scenarios", 14th IEEE Proceedings on Personal, Indoor and Mobile Radio Communications, vol. 2, Sep. 2003, pp. 1949-1953.

Lin et al., "STBC for Wireless Communication: a Least Square Interpretation", Proceedings IEEE Region 10 Conference on Computers, Communications, Control and Power Engineering, vol. 2, Oct. 28-31, 2002, pp. 972-975.

Ma et al., "An EM-Based Channel Estimation Algorithm for Space-Time and Space-Frequency Block Coded OFDM", Proceedings IEEE International Conference on Acoustics, Speech, and Signal, vol. 4, 2003, pp. 389-392.

Okamoto et al., "SFBC-OFDM Decoding Schemes for IEEE 802.11g Based WLAN System", Proceedings of the IEICE General Conference, The Institute of Electronics, Information and Communication Engineers, Mar. 8, 2004, 5 pages.

Rouquette et al., "Orthogonal Full Diversity Space-Time Block Coding Based on Transmit Channel State Information for 4 Tx Antennas", IEEE International Conference on Communications, vol. 1, Apr. 28-May 2, 2002, pp. 558-562.

Torabi et al., "Variable-Rate OFDM Systems with Selective Antenna Diversity and Adaptive Modulation", 57th IEEE Spectrum Vehicular Technology Conference, vol. 1, Apr. 22-25, 2003, pp. 562-566.

Xia et al., "Adaptive MIMO-OFDM Based on Partial Channel State Information", IEEE Transactions on Signal Processing, vol. 52, No. 1, Jan. 2004, pp. 202-213.

Lihua et al., "A Practice Space-Frequency Block Coded OFDM Scheme for Fast Fading Broadband Channels", 13th IEEE International Symposium on Personal, Indoor and Mobile Radio Communications, Sep. 18, 2002, 6 pages.

* cited by examiner

METHOD AND APPARATUS FOR IMPLEMENTING SPACE FREQUENCY BLOCK CODING IN AN ORTHOGONAL FREQUENCY DIVISION MULTIPLEXING WIRELESS COMMUNICATION SYSTEM

CROSS REFERENCE TO RELATED APPLICATION

This application is a continuation of U.S. patent application Ser. No. 15/061,703, filed Mar. 4, 2016, which is a continuation of U.S. patent application Ser. No. 14/695,989, filed Apr. 24, 2015, which issued as U.S. Pat. No. 9,306,702 on Apr. 5, 2016, which is a continuation of U.S. patent application Ser. No. 14/021,783, filed Sep. 9, 2013, which issued as U.S. Pat. No. 9,054,924 on Jun. 9, 2015, which is a continuation of U.S. patent application Ser. No. 12/360,315, filed Jan. 27, 2009, which issued as U.S. Pat. No. 8,532,210 on Sep. 10, 2013, which is a continuation of U.S. patent application Ser. No. 11/201,695, filed Aug. 11, 2005, which issued as U.S. Pat. No. 7,505,529 on Mar. 17, 2009, which claims the benefit of U.S. Provisional Application No. 60/601,338 filed Aug. 12, 2004, which are incorporated by reference as if fully set forth.

FIELD OF INVENTION

The present invention is related to wireless communication systems. More particularly, the present invention is related to a method and apparatus for implementing space frequency block coding (SFBC) in an orthogonal frequency division multiplexing (OFDM) wireless communication system.

BACKGROUND

OFDM is a data transmission scheme where data is split into a plurality of smaller streams and each stream is transmitted using a sub-carrier with a smaller bandwidth than the total available transmission bandwidth. The efficiency of OFDM depends on choosing these sub-carriers orthogonal to each other. The sub-carriers do not interfere with each other while each carrying a portion of the total user data.

OFDM system has advantages over other wireless communication systems. When the user data is split into streams carried by different sub-carriers, the effective data rate on each subcarrier is much smaller. Therefore, the symbol duration is much larger. A large symbol duration can tolerate larger delay spreads. In other words, it is not affected by multipath as severely. Therefore, OFDM symbols can tolerate delay spreads without complicated receiver designs. However, typical wireless systems need complex channel equalization schemes to combat multipath fading.

Another advantage of OFDM is that the generation of orthogonal sub-carriers at the transmitter and receiver can be done by using inverse fast Fourier transform (IFFT) and fast Fourier transform (FFT) engines. Since the IFFT and FFT implementations are well known, OFDM can be implemented easily and does not require complicated receivers.

Multiple-input multiple-output (MIMO) refers to the type of wireless transmission and reception scheme where both a transmitter and a receiver employ more than one antenna. A MIMO system takes advantage of the spatial diversity or spatial multiplexing and improves signal-to-noise ratio (SNR) and increases throughput.

SFBC is a scheme for transmitting symbols of a space diversity coding on neighboring subcarriers rather than on the same subcarrier in the successive time slots. The SFBC avoids the problem of fast time variations in space time block coding. However, the channel needs to be constant over the subcarriers that combining takes place.

SUMMARY

The present invention is related to a method and apparatus for implementing space frequency block coding (SFBC) in an orthogonal frequency division multiplexing (OFDM) wireless communication system. The present invention is applicable to both a closed loop mode and an open loop mode. In the closed loop mode, power loading and eigen-beamforming are performed based on channel state information (CSI). A channel coded data stream is multiplexed into two or more data streams. Power loading is performed based on the CSI on each of the multiplexed data streams. SFBC encoding is performed on the data streams for each of the paired subcarriers. Then, eigen-beamforming is performed based on the CSI to calculate eigenbeams over multiple transmit antennas. The power loading may be performed on two or more SFBC encoding blocks or on each eigenmodes. Additionally, the power loading may be performed across subcarriers or subcarrier groups for weak eigenmodes.

In accordance with the present invention, a robust channel estimation can be provided in all channel conditions, with or without channel information feedback, and low complexity is achieved at both transmitter and receiver. In addition, scalable solution can be used with any antenna configuration and backward compatibility is provided with enhanced performance with 802.11a/g.

DETAILED DESCRIPTION OF THE PREFERRED EMBODIMENTS

Figure 1:
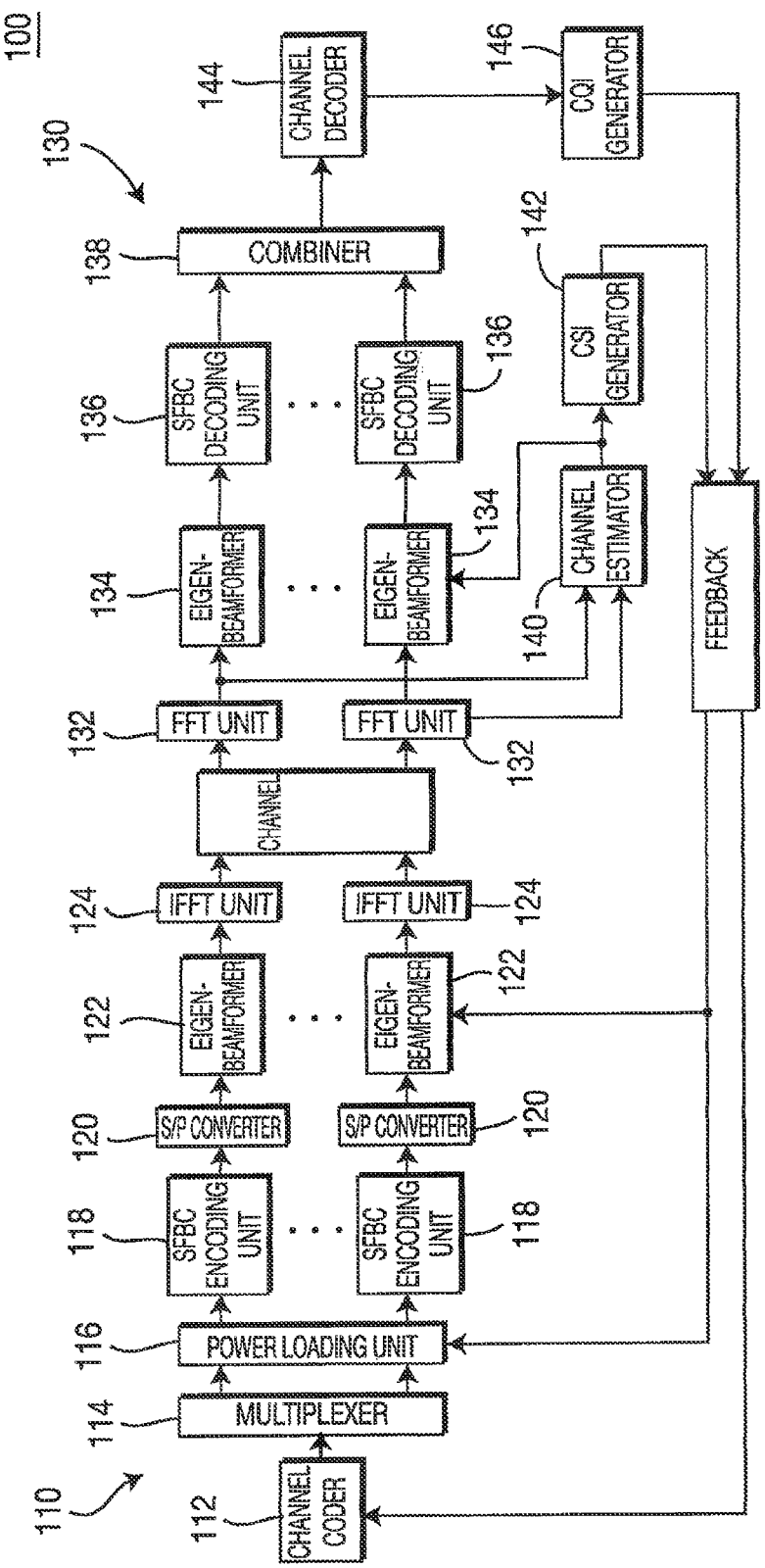
FIG. 1 is a block diagram of an OFDM-MIMO system implementing a closed loop mode.

Hereafter, the terminology "station" (STA) includes but is not limited to a user equipment, a wireless transmit/receive unit, a fixed or mobile subscriber unit, a pager, or any other type of device capable of operating in a wireless environment. When referred to hereafter, the terminology "access point" (AP) includes but is not limited to a Node-B, a base station, a site controller or any other type of interfacing device in a wireless environment.

The present invention will be described with reference to the drawing figures wherein like numerals represent like elements throughout. It should be noted that figures provided in the present invention are high level functional block diagrams and the functions implemented by the functional blocks may be implemented by more or less blocks. The features of the present invention may be incorporated into an integrated circuit (IC) or be configured in a circuit comprising a multitude of interconnecting components.

Embodiments of the present invention provide a transmitter implementing SFBC MIMO coding and receiver matched filter. Embodiments also provide transmitter channel precoding and receiver antenna processing as well as channel decomposition functions.

There are two modes of operation of the system: a closed loop and an open loop. The closed loop is used when channel state information (CSI) is available to the transmitter. The open loop is used when CSI is not available. A variant may be used for transmission to legacy STA where it provides diversity benefits.

In the closed loop mode, CSI is used to create virtual independent channels by decomposing and diagonalizing the channel matrix and by precoding at the transmitter. Given the eigenvalue spread of TGn channels the present invention employs a space-frequency orthogonal MIMO coding in the transmitter at the input to the channel precoder to increase robustness at the cost of decreasing data rate. Any coding scheme in MIMO has to deal with the diversity versus multiplexing gain trade off. It is desirable to have a trade off scheme that is best suited to particular channel statistics. An SFBC is chosen due to low mobility and the long coherence time of the channel. This scheme allows for receiver implementation simpler than a MMSE receiver. The combined solution enables higher throughput over a larger range. Embodiments of the present invention allow for per subcarrier power/bit loading and maintains a sustained robust link through closed loop operation with channel state feedback. Another potential benefit is that it is easily scalable to any number of antennas at both transmitter and receiver.

The CSI can be obtained at the transmitter either by feedback from the receiver or through exploiting channel reciprocity. Channel reciprocity is useful for mainly TDD based systems. In this case it is possible for the transmitter and receiver to independently estimate and decompose the channel. The channel update rate can be lowered when the SNR is high resulting in a reduced feedback bandwidth load. Latency requirements and feedback data rates are typically not significant to the inherent frequency non-selectivity of eigenvalues.

The closed loop mode requires calibrations of the transmitter to compensate amplitude and phase difference of the estimated channels in the uplink and downlink directions. This is done infrequently, for example during STA association or under application control, and can use channel reciprocity for the estimation of the channel at both ends. In addition, a CQI (or SNR) per eigen-beam is fed back to the transmitter to support adaptive rate control.

FIG. 1 is a block diagram of an OFDM-MIMO system 100 implementing a closed loop mode. The system 100 comprises a transmitter 110 and a receiver 130. The transmitter 110 comprises a channel encoder 112, a multiplexer 114, a power loading unit 116, a plurality of SFBC encoding units 118, a plurality of serial-to-parallel (S/P) converters 120, a plurality of eigen-beamformers 122, a plurality of IFFT units 124 and a plurality of transmit antennas (not shown). The channel encoder 112 encodes data preferably in accordance with a channel quality indicator (CQI) which is sent from the receiver 130. The CQI is used to determine a coding rate and modulation scheme per sub-carrier or group of sub-carriers. The coded data stream is multiplexed by the multiplexer 114 into two or more data streams.

The transmit power level of each data stream is adjusted by the power loading unit 116 based on feedback. The power loading unit 116 adjusts power levels with respect to the data rate of each eigenbeam to balance the total transmit power over all eigenbeams (or sub-carriers), which will be explained in detail below.

The SFBC encoding units 118 perform SFBC encoding on the data streams. SFBC encoding is done over eigen-beams and sub-carriers for each data rate that is transmitted. Eigen-beam and sub-carrier pairs are selected to ensure independent channels. OFDM symbols are carried on K sub-carriers. To accommodate SFBC, the sub-carriers are divided into L pairs of sub-carriers (or group of sub-carriers). The bandwidth of each group of sub-carriers should be less than the coherence bandwidth of the channel. However, when combined with eigen-beamforming this restriction is relaxed due to the frequency insensitivity of the eigen-beams.

The pairs of sub-carrier groups used by the block code are considered independent. The following is an example of the Alamouti type SFBC applied to an OFDM symbol:

$$S = \begin{bmatrix} s_1 & -s_2^* \\ s_2 & s_1^* \end{bmatrix}.$$

Once the SFBC encoding units 118 construct OFDM symbols for all sub-carriers, the coded blocks are multiplexed by the S/P converters 120 and input to the eigen-beamformers 122. The eigen-beamformers 122 distribute the eigenbeams to the transmit antennas. The IFFT units 124 convert the data in frequency domain to the data in time domain.

The receiver 130 comprises a plurality of receive antennas (not shown), a plurality of FFT units 132, eigen-beamformers 134, SFBC decoding units 136, a combiner 138, a channel decoder 144, a channel estimator 140, a CSI generator 142 and a CQI generator 146.

The FFT units 132 convert the received samples to frequency domain and the eigen-beamformer 134, the SFBC decoding unit 136 and a channel decoder 144 perform the opposite operation which is performed at the transmitter 110. The combiner 138 combines the SFBC decoding results using maximal ratio combining (MRC).

The channel estimator 140 generates channel matrix using a training sequence transmitted from the transmitter and decomposes the channel matrix into two beam-forming unitary matrices U and V, (U for transmit and V for receive), and a diagonal matrix D per sub-carrier (or per sub-carrier group) by singular value decomposition (SVD) or eigenvalue decomposition. The CSI generator 142 generates CSI from the channel estimation results and the CQI generator generates a CQI based on the decoding results. The CSI and the CQI are sent back to the transmitter 110.

The channel matrix H between nT transmit antennas and nR receive antennas can be written as follows:

$$H = \begin{bmatrix} h_{11} & h_{21} & \ldots & h_{1,nT} \\ h_{21} & h_{22} & \ldots & h_{2,nT} \\ & & \ddots & \vdots \\ h_{nR,1} & h_{nR,2} & \ldots & h_{nR,nT} \end{bmatrix}$$

The channel matrix H is decomposed by SVD as follows:

$$H = UDV^H,$$

where U and V are unitary matrices and D is a diagonal matrix. $U \in C^{nRxnR}$ and $V \in C^{nTxnT}$. Then, for transmit symbol vector s, transmit precoding is simply performed as follows:

$x = Vs$ (transmitted signal).

The received signal becomes as follows:

$y = HVs + n$, where it is the noise introduced in the channel. The receiver completes the decomposition by using a matched filter:

$V^H H^H = V^H V D^H U^H = D^H U^H$.

After normalizing channel gain for eigenbeams, the estimate of the transmit symbols s becomes $$\hat{s} = \alpha D^H U^H H V s + \eta$$
$$= s + \eta.$$

s is detected without having to perform successive interference cancellation or MMSE type detector. $D^H D$ is a diagonal matrix that is formed by eigenvalues of H across the diagonal. Therefore, the normalization factor $\alpha = D^{-2}$. U are eigenvectors of $HH^H$, V are eigenvectors of $H^H H$ and D is a diagonal matrix of singular values of H (square roots of eigenvalues of $HH^H$).

Figure 2:
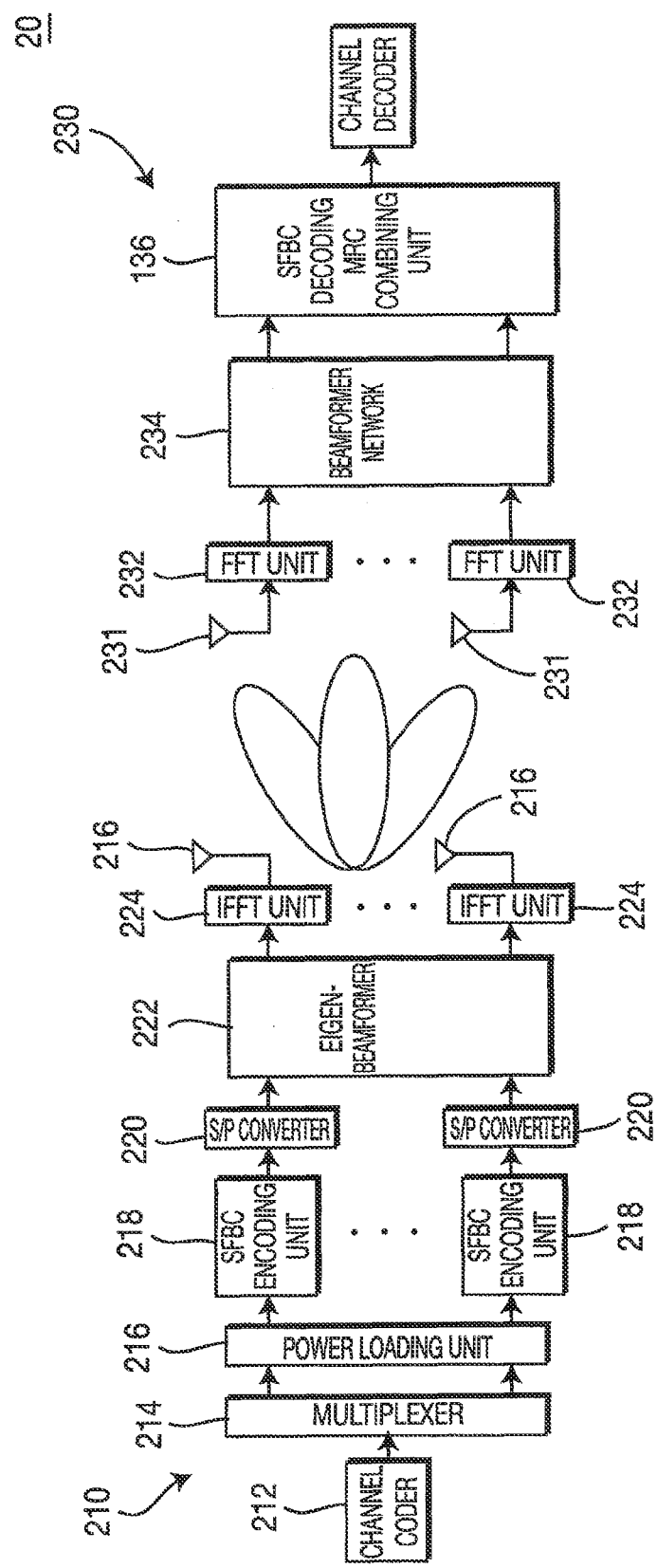
FIG. 2 is a block diagram of a system implementing open loop.

FIG. 2 is a block diagram of a system 200 implementing open loop mode in accordance with the present invention. The system 200 comprises a transmitter 210 and a receiver 230. In the open loop mode, a combination of space-frequency coding and spatial spreading in the transmitter 210 provides diversity without requiring CSI. A variant of this scheme can be used when operating with legacy 802.11a/g STAs.

The transmitter 210 comprises a channel encoder 212, a multiplexer 214, a power loading unit 216, a plurality of SFBC encoding units 218, a plurality of serial-to-parallel (S/P) converters 220, a beamformer network (BFN) 222, a plurality of IFFT units 224 and a plurality of transmit antennas 226. As in the closed loop mode, the channel encoder 212 uses CQI to determine coding rate and modulation per sub-carrier or group of sub-carriers. The coded data stream is multiplexed by the multiplexer 214 into two or more data streams.

In the open loop, the eigen-beamformer is replaced with the Beam Forming Network (BFN) 222. The BFN 22 forms N beams in space, where N is the number of antennas 226. The beams are pseudo-randomly constructed by the BFN matrix operation. The independent sub-carrier groups used for the SFBC coding are transmitted on individual beams.

For legacy support, SFBC coding may not be performed. Instead diversity through beam permutation is performed which improves diversity and therefore the performance of legacy 802.11a/g equipment.

The receiver 230 comprises receive antennas 231, FFT units 232, a BFN 234, an SFBC decoding and combining unit 236 and a channel decoder 238. The FFT units 232 convert the received signal in time domain to the signal in frequency domain. The SFBC decoding and combining unit 236 decodes and combines symbols received from sub-carrier groups/eigen-beams and converts them from parallel to serial using a prior knowledge of the constellation size. Symbols are combined using MRC. The channel decoder 238 decodes the combined symbol and generates a CQI.

A first embodiment of power loading is explained hereinafter. The spatial processing is a combination of space-frequency coding and eigen-beamforming. This is performed to give the best compromise between the redundancy gains that SFBC affords and the spatial multiplexing that the eigen-beamformer provides. The power loading scheme operates across the eigen-modes of the channel matrix. However, SFBC also introduces the constraint that the outputs of the coder have the same power loading no matter what the input power loading is due to the cross-operation inside the coder.

Figure 3:
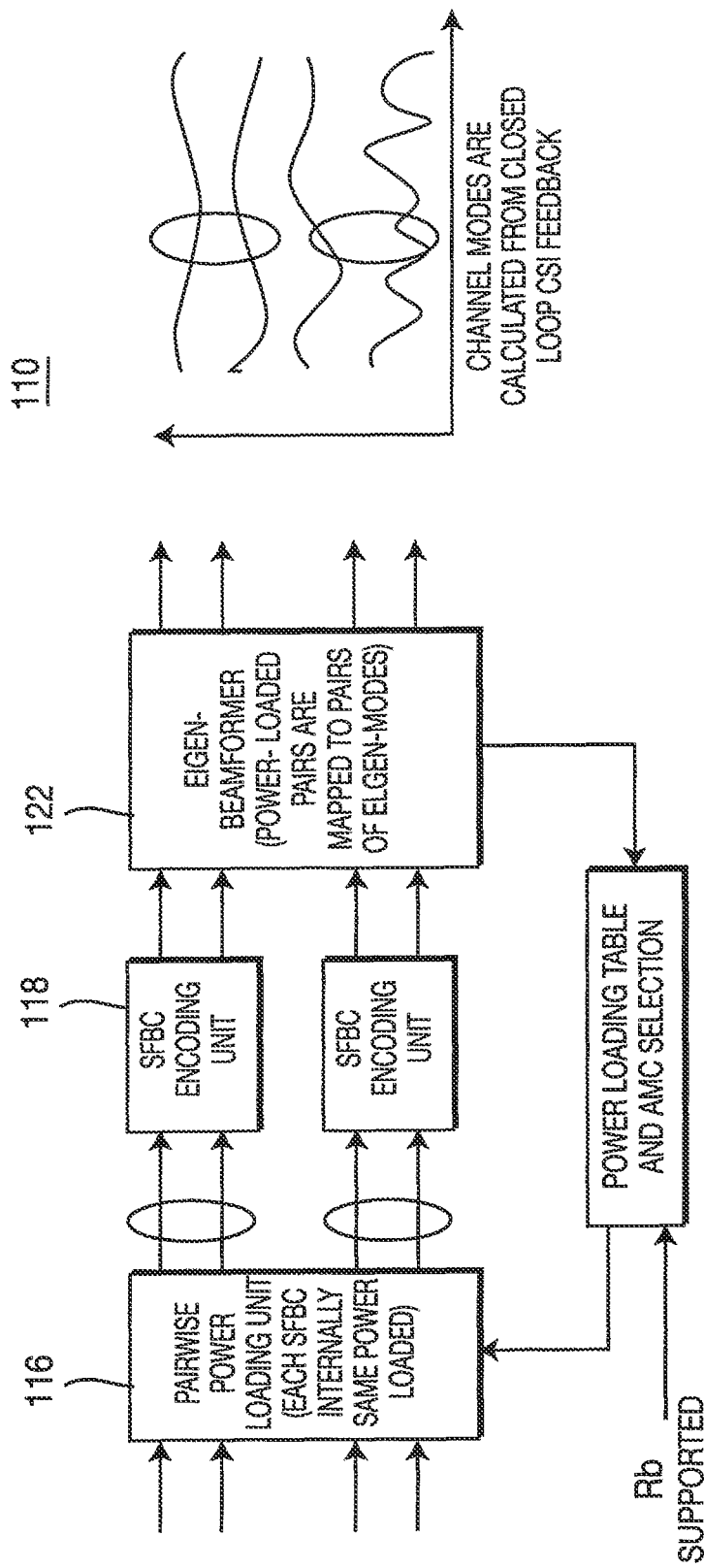
FIG. 3 is a block diagram of a transmitter for depicting power loading.

FIG. 3 is a block diagram of a transmitter 110 for depicting power loading. FIG. 3 illustrates 4×4 case as an example and the first embodiment of the power loading scheme will be explained with reference to 4×4 case. However, it should be noted that the 4×4 case can be extended to any other cases.

For a particular subcarrier k, four streams of data are mapped to 2 pairs of power loading/AMC modes. In other words the modulation order is selected the same for each pair of inputs. This is later mapped to pairs of eigenmodes. Output of the power loading unit 116 is applied to the dual 2×2 SFBC encoding units 118 and then passed on to the eigen-beamformer 122. The eigen-beamformer 122 maps the inputs to the eigen-modes of the channel through the preprocessing.

For all K subcarriers, the eigenvalues of the channel matrix are known at the transmitter. The channel energy for each eigenmode is defined as follows:

$$\alpha_i = \sum_{k=1}^{K} |\lambda_{i,k}|^2,$$

where $\lambda_{i,k}$ is the i-th eigenvalue for the k-th subcarrier's channel. Two SNIRs are defined for two coupled eigenmodes as follows:

$$\beta_{mod1} = \sum_{i=1}^{M/2} |\alpha_i|^2 \text{ and } \beta_{mod2} = \sum_{i=M/2+1}^{M} |\alpha_i|^2$$

where M is the number of eigenmodes. In other words, the eigenmodes are grouped such that half of the eigenmodes with the largest channel energy (or SNIR) are in one group and the other half with the weakest channel energies are in the other. Therefore, the harmonic SNIRs represent the total channel energy of the stronger and weaker eigenmodes. Channel energy is an indication of how robust the eigenmodes and hence the signal that is carried over these eigenmodes would be. This information is used to apply different adaptive modulation and coding (AMC) and/or different power loading for each half as is explained in more detail subsequently. The separation of the coupled SNIRs are defined as follows:

$\Delta_\beta = \beta_{mod1} - \beta_{mod2}$

During the closed loop operation the transmitter 110 has the knowledge of current CSI from which it extracts the eigenvalues and preprocessing matrix. The transmitter 110 also infers the data rate that can be supported in the link, Rb, from the CSI. Then, power loading for a given, acceptable, CQI is an optimization between the number of bits that can be sent per OFDM symbol and the type of modulation that is to be used for each mode.

Figure 4:
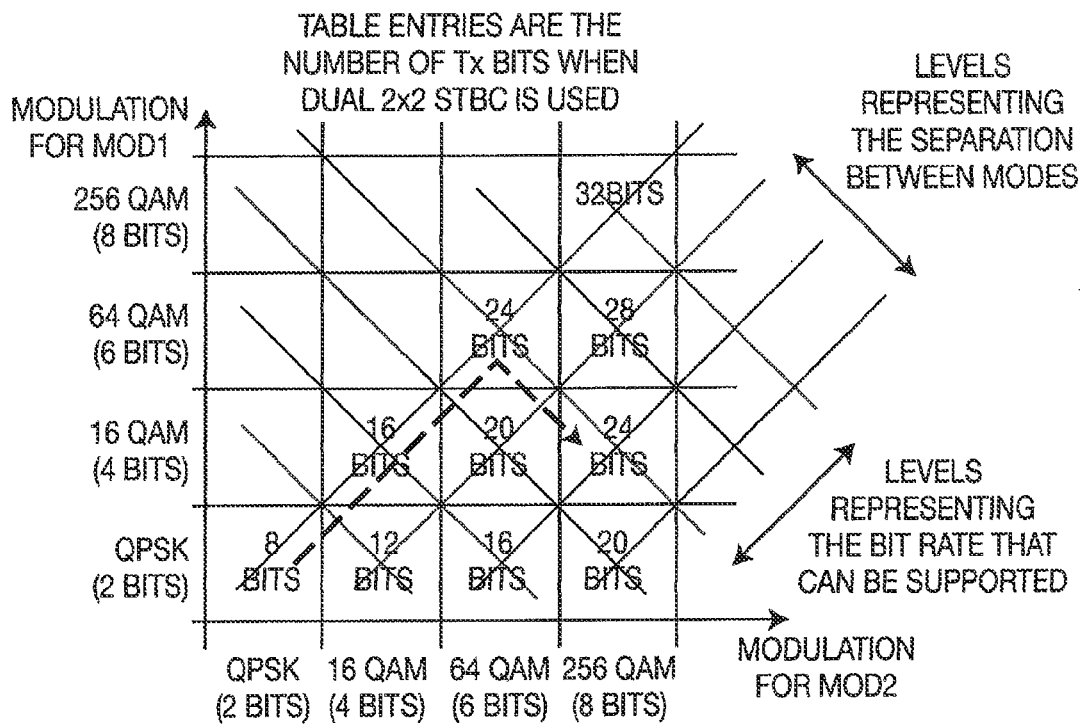
FIG. 4 is a diagram of an exemplary power loading and adaptive modulation and coding mapping between two pairs of modes.

Using the channel energy calculated for eigenmode i as explained above, the maximum bit rate that can be supported for the channel condition is determined. Then, using the mode separation calculation above it is determined how the bit rate needs to be distributed between the two pairs of modes. FIG. 4 is a diagram of an exemplary power loading and adaptive modulation and coding mapping between two pairs of modes. In this example, the bit rate that can be supported is 24 bits per OFDM symbol for the particular sub-carrier. The lowest modulation order satisfying the bit rate is found in FIG. 4 as indicated by the dashed arrow. In this example, first and second modes (first pair of coupled modes) will be using 16 QAM and third and fourth modes (second pair of coupled modes) will be using 256 QAM.

Note that this mapping is described for one CQI that is acceptable and for one subcarrier. In the case of alternative MIMO configurations, such as 2×4, 2×2, etc, the same power loading scheme is applicable except that the total number of bits in the table entries are scaled down to represent the transmit capability and that power loading can be done on a single pair of modes.

A power loading scheme in accordance with a second embodiment is explained hereinafter. The eigenvalues per subcarrier $(\lambda_1(k) > \lambda_2(k) > \ldots > \lambda_{nT}(k))$ are ranked and eigenbeams $(E^1, E^2, \ldots, E^{nT})$ are created by grouping the same ranked eigenvalues for all subcarriers as follows:

$$E^i = \{\lambda_i(1), \lambda_i(2), \ldots, \lambda_i(k)\} \text{ for } i=1,2,\ldots,nT,$$

where K is the number of subcarriers, nT is the number of transmit antennas and $\lambda_i(j)$ is the i-th eigenvalue of the j-th subcarrier. nT is an even number.

The average of the eigenvalues per eigenbeam are computed as follows:

$$\lambda_{av}^i = \frac{1}{K}\sum_{j=1}^{K} \lambda_i(j) \text{ for } i = 1, 2, \ldots, nT.$$

Figure 5:
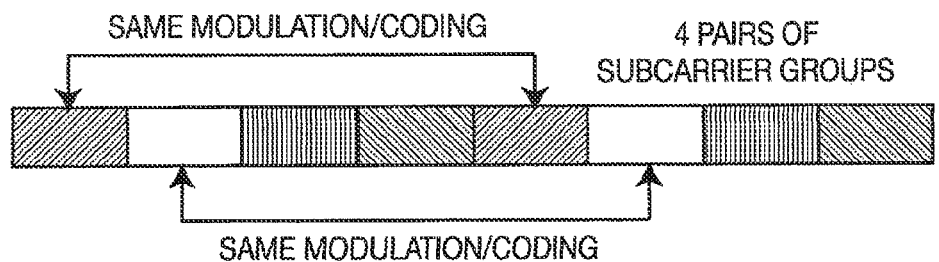
FIG. 5 shows an example of pairing of subcarrier groups for power/bit loading.

The eigenbeams are paired to create Alamouti space-frequency blocks, such as $\{E^1, E^2\}_1, \{E^3, E^4\}_2, \ldots, \{E^{2i-1}, E^{2i}\}_i \ldots \{E^{nT-1}, E^{nT}\}_{nT/2}$. However, if the SNR of a pair is greater than $SNR_{max}$, then the second eigenbeam of the pair is replaced with the eigenbeam with the next lower eigenvalue average until its SNR is less than or equal to $SNR_{min}$.

$$SNR(i) = (\lambda_{av}^i + \lambda_{av}^{i+1})/\sigma_n^2,$$

where $\sigma_n^2$ is the noise variance and $SNR_{min}$ is the minimum required SNR for the highest data rate for a required quality of service. This step is repeated until all the eigenbeams are paired. FIG. 5 shows an example of pairing of subcarrier groups for power/bit loading.

A data rate for each pair of eigenbeams are determined by mapping the SNR of a pair to the data rate for a given quality. The required SNRs may be adjusted for all pairs of eigenbeams to compensate for the measurement errors and make the total transmit power be constant.

A weight vector per pair of eigenbeams per subcarrier may be computed as follows:

$$w_k(i, j) = \sqrt{\frac{SNR(i)\sigma_n^2}{2\lambda_i(j)}},$$

where i is the i-th pair of eigenbeams, j is the j-th subcarrier.

In accordance with the third embodiment, in addition to the first or second embodiment, another power loading is applied across the sub-carriers or group of sub-carriers for weak eigen-modes. In other word, instead of power loading being applied to all eigenmodes it can be applied only to those that are weaker and hence can benefit from the power loading the most. In such a case, those eigenmodes that are not power loaded can still have SFBC or other coding or can have different AMC settings individually, whereas those eigenmodes that power loaded share the same AMC setting for instance. Also, the eigenmodes of the channel are always ordered in power, from strongest to weakest. By pairing eigenmodes of similar power one may improve the power loading of the channel.

A spatial processing scheme is configurable to any number of receive and transmit antenna combinations. Depending on the number of antennas on each side, a combination of SFBC and eigen-beamforming options are used. The table below summarizes the various configurations supported and the state of the spatial processing and power loading that is applicable to each scenario.

TABLE 1

| Antenna Configuration (Tx × Rx) | Space Frequency Block Code | Eigen-Beamforming |
|---|---|---|
| M × N (M, N ≠ 1) | M/2 block codes | M beams at Tx N beams at Rcv |
| 1 × N (N ≠ 1) | not used | To be determined by receiver vendor |
| M × 1 (M ≠ 1) | M/2 block codes | M beams at Tx |

Although the features and elements of the present invention are described in the preferred embodiments in particular combinations, each feature or element can be used alone without the other features and elements of the preferred embodiments or in various combinations with or without other features and elements of the present invention.

What is claimed is:

1. A device configured to perform space frequency block coding (SFBC) in an orthogonal frequency division multiplexing (OFDM) wireless communication system, the device comprising:
   a plurality of antennas; and
   a processor configured to:
      generate a channel coded data stream comprising a plurality of data bits;
      SFBC encode the channel coded data stream to generate an SFBC encoded data stream using one or more pairs of OFDM sub-carriers and an Alamouti type SFBC code;
      beamform the SFBC encoded data stream to generate a SFBC encoded beamformed data stream; and
      transmit the SFBC encoded beamformed data stream via the plurality of antennas as an OFDM signal.

2. The device of claim 1, wherein the processor is configured to:
   SFBC encode the channel coded data stream using a plurality of pairs of OFDM sub-carriers; and
   transmit the SFBC encoded beamformed data stream over the plurality of pairs of OFDM sub-carriers using the plurality of antennas as the OFDM signal.

3. The device of claim 2, wherein a portion of the channel coded data stream that is SFBC encoded using a pair of OFDM sub-carriers of an OFDM symbol is SFBC encoded independently of another portion of the channel coded data stream that is SFBC encoded using other pairs of OFDM sub-carriers of the OFDM symbol.

4. The device of claim 3, wherein each portion of the channel coded data stream that is SFBC encoded using a pair of OFDM sub-carriers is encoded using an Alamouti type SFBC code.

5. The device of claim 2, wherein a first pair of OFDM sub-carriers of an OFDM symbol is mapped to a first pair of antenna ports and a second pair of OFDM sub-carriers of the OFDM symbol is mapped to a second pair of antenna ports.

6. The device of claim 1, wherein the processor is further configured to receive channel state information (CSI), and SFBC encode the channel coded data stream based on the received CSI.

7. The device of claim 1, wherein the processor is further configured to SFBC encode the channel coded data stream to generate the SFBC encoded data stream in an open loop mode, and wherein channel state information (CSI) is not provided to the device by a receiver device that receives the OFDM signal when operating in the open loop mode.

8. The device of claim 1, wherein the processor is configured to receive channel quality information (CQI) on a per group of OFDM sub-carrier basis, and generate the channel coded data stream based on the received CQI; and
wherein the processor is configured to determine at least one of a coding rate and a modulation type for the channel coded data stream on a per sub-carrier basis or on a per group of sub-carriers basis based on the received CQI.

9. The device of claim 1, wherein the device comprises a wireless transmit/receive unit (WTRU).

10. The device of claim 1, wherein the device comprises a base station.

11. A method for performing space frequency block coding (SFBC) by a device in an orthogonal frequency division multiplexing (OFDM) wireless communication system, the method comprising:
generating a channel coded data stream comprising a plurality of data bits;
SFBC encoding the channel coded data stream to generate an SFBC encoded data stream using one or more pairs of OFDM sub-carriers and an Alamouti type SFBC code;
beamforming the SFBC encoded data stream to generate a SFBC encoded beamformed data stream; and
transmitting the SFBC encoded beamformed data stream via a plurality of antennas as an OFDM signal.

12. The method of claim 11, further comprising
SFBC encoding the channel coded data stream using a plurality of pairs of OFDM sub-carriers; and
transmitting the SFBC encoded beamformed data stream over the plurality of pairs of OFDM sub-carriers using the plurality of antennas as the OFDM signal.

13. The method of claim 12, wherein a portion of the channel coded data stream that is SFBC encoded using a pair of OFDM sub-carriers of an OFDM symbol is SFBC encoded independently of another portion of the channel coded data stream that is SFBC encoded using other pairs of OFDM sub-carriers of the OFDM symbol.

14. The method of claim 13, wherein each portion of the channel coded data stream that is SFBC encoded using a pair of OFDM sub-carriers is encoded using an Alamouti type SFBC code.

15. The method of claim 12, wherein a first pair of OFDM sub-carriers of an OFDM symbol is mapped to a first pair of antenna ports and a second pair of OFDM sub-carriers of the OFDM symbol is mapped to a second pair of antenna ports.

16. The method of claim 11, further comprising:
receiving channel state information (CSI); and
SFBC encoding the channel coded data stream based on the received CSI.

17. The method of claim 11, further comprising:
SFBC encoding the channel coded data stream to generate the SFBC encoded data stream in an open loop mode, and wherein channel state information (CSI) is not provided to the device by a receiver device that receives the OFDM signal when operating in the open loop mode.

18. The method of claim 11, further comprising:
receiving channel quality information (CQI) on a per group of OFDM sub-carrier basis;
generating the channel coded data stream based on the received CQI; and
determining at least one of a coding rate and a modulation type for the channel coded data stream on a per sub-carrier basis or on a per group of sub-carriers basis based on the received CQI.

19. The method of claim 11, wherein the device comprises a wireless transmit/receive unit (WTRU).

20. The method of claim 11, wherein the device comprises a base station.

* * * * *